FUEL PUMP

Original Filed Aug. 28, 1958 2 Sheets-Sheet 1

INVENTOR.
RUSSELL F. SMITH
BY
Laurence M. Goodridge
ATTORNEY

FUEL PUMP

Original Filed Aug. 28, 1958 2 Sheets-Sheet 2

INVENTOR.
RUSSELL F. SMITH
BY
Lawrence M. Goodridge
ATTORNEY

United States Patent Office

Re. 25,849
Reissued Sept. 7, 1965

25,849
FUEL PUMP

Russell F. Smith, St. Louis, Mo., assignor to ACF Industries, Incorporated, New York, N.Y., a corporation of New Jersey Original No. 2,969,746, dated Jan. 31, 1961, Ser. No. 757,796, Aug. 28, 1958. Application for reissue Feb. 12, 1962, Ser. No. 173,858
18 Claims. (Cl. 103—150)

Matter enclosed in heavy brackets [ ] appears in the original patent but forms no part of this reissue specification; matter printed in italics indicates the additions made by reissue.

This invention relates to pumps, and more particularly to a pump especially suitable for pumping fuel to the carburetor for an internal combustion engine, the pump being operable by a drive from the engine.

In certain present fuel pumps, pumping is accomplished by means of a diaphragm, the diaphragm being driven by a spring through a discharge stroke in response to demand for fuel from the carburetor, and returned through a suction stroke by a drive from the engine including a rocker arm actuated by an engine-driven cam means in such manner that during part of a cycle of the cam means, the rocker arm is free to allow the diaphragm to be flexed by the spring through a discharge stroke, and during another part of the cycle the arm is adapted positively to move the diaphragm through a suction stroke. The rocker arm is usually actuated by a push rod, which in turn is actuated by an engine-driven cam.

Among the several objects of this invention may be noted the provision of a fuel pump which is adapted to be actuated directly from the push rod, thereby enabling the pump to be manufactured with fewer parts; and the provision of such a pump which minimizes fuel pulsations so as to have a smooth action. In general, these objects are attained by providing two expansible chamber pump units, each preferably of the diaphragm type, which means connecting the units for actuation of one unit through a discharge stroke and accompanying actuation of the other through a return stroke and vice versa, and with a passage from a first of the units to the second unit and a check valve in the passage adapted to open on a discharge stroke of the first unit and to close on a return stroke of the first unit. With this arrangement, the units may be actuated in one direction by a spring, as in present fuel pumps, and in the opposite direction directly by a push rod. On actuation by the spring, fuel is forced out of the first unit to the second, and the excess is pumped through the pump outlet. On actuation by the rod, fuel is forced through the outlet by the second unit, and the first unit is primed. Other objects and features will be in part apparent and in part pointed out hereinafter.

The invention accordingly comprises the constructions hereinafter described, the scope of the invention being indicated in the following claims.

Figure 1:
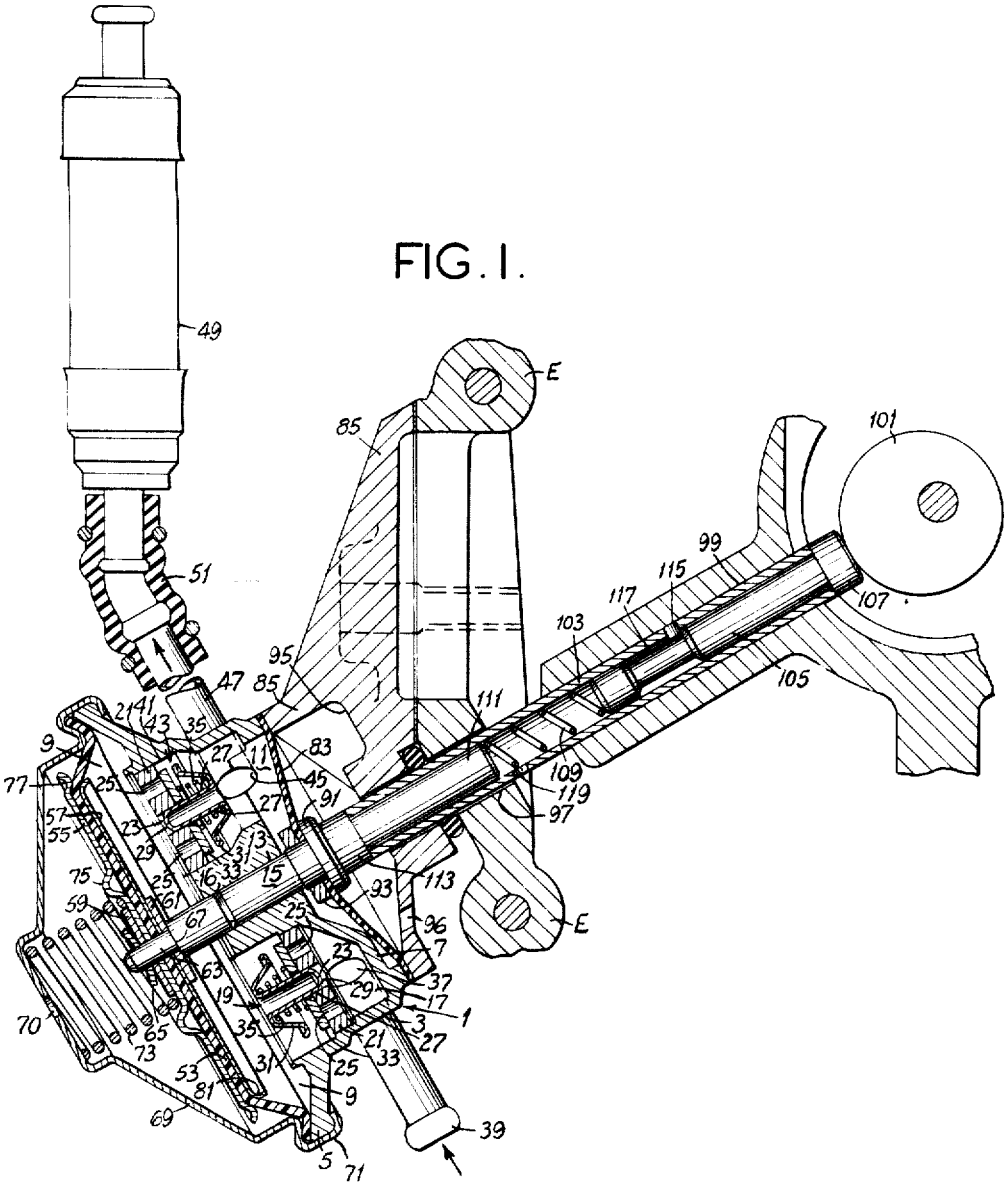
Figure 2:
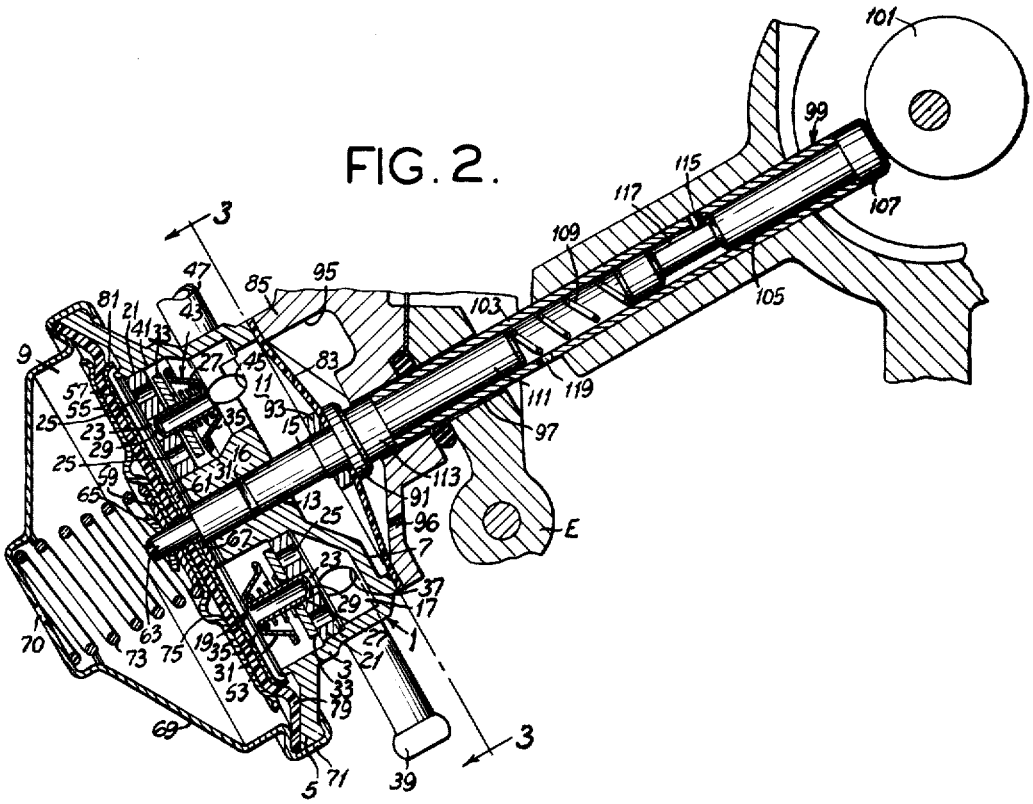
Figure 3:
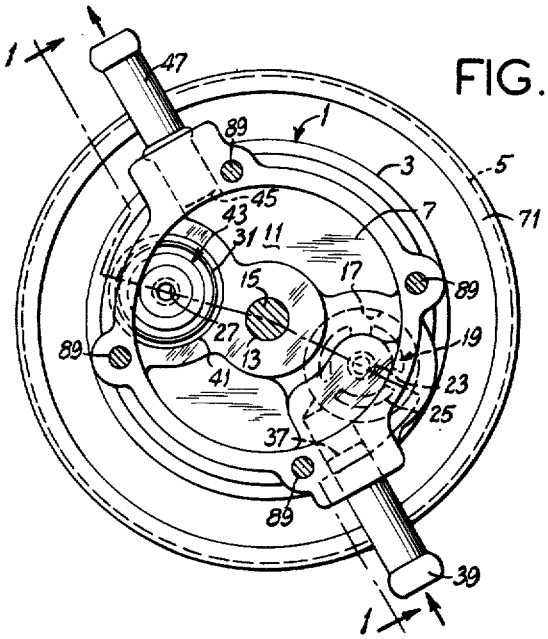

In the accompanying drawings, in which one of various possible embodiments of the invention is illustrated, FIG. 1 is a cross section of a pump of this invention, taken on line 1—1 of FIG. 3, and showing parts in a first position;

FIG. 2 is a view corresponding to FIG. 1 showing parts in a second position; and, FIG. 3 is a section taken on line 3—3 of FIG. 2.

Corresponding reference characters indicate corresponding parts throughout the several views of the drawings.

Referring to the drawings, a pump of this invention is shown to comprise a body 1 constituted by a metal casting having an annular cylindrical wall 3. At one end of the wall 3 there is a flange 5 generally of conical form flaring outward away from the wall. The body 1 is formed with a partition 7 dividing the space therein into a first pumping chamber 9 bounded by flange 5 and a second pumping chamber 11 bounded by wall 3. Partition 7 has a central opening 13. Slidable in the opening 13 is a rod 15. A packing ring 16 is provided on the rod for sealing in the opening 13.

Radially outward from the opening 13, the partition is formed with an inlet passage 17 which opens in the direction toward the flanged end of wall 3, i.e., toward the first pumping chamber 9. In this inlet passage is an inlet check valve 19 comprising a valve seat 21 pressed in the passage having a central hole 23 and a series of ports 25, such as arcuate slots, around the hole 23. Pressed in the hole 23 is a hollow stem 27 closed as indicated at 29 at its end in the hole and having at its other end a mushroom head 31 constituting a spring seat. Stem 27 extends from the valve seat 21 in the direction toward pumping chamber 9. A ring-shaped disk valve member 33, which may be made of a suitable fuel-resistant synthetic rubber for cushioned sealing, is slidable on the stem and is biased toward engagement with the valve seat by a coil compression spring 35 surrounding the stem reacting from spring seat 21. Wall 3 has a lateral opening 37 leading into passage 17 on the side of valve seat 21 away from chamber 9, and an inlet nipple 39 is pressed in opening 37. Nipple 39 is adapted for connection thereto of a fuel supply line from a fuel tank (not shown).

Approximately diametrically opposite the recess 17, partition 7 is provided with a circular opening 41 in which there is provided an outlet check valve 43 providing for flow from chamber 9 to chamber 11 and preventing flow from chamber 11 to chamber 9. Valve 43 is of identical construction to valve 19, differing therefrom only in its position, having its valve seat 21 pressed in opening 41 with its stem 27 extending in the direction away from chamber 9 instead of in the direction toward chamber 9 as in the case of valve 19. Wall 3 has a lateral opening 45 leading out of chamber 11, and an outlet nipple 47 is pressed in opening 45. A fuel filter 49 is shown in FIG. 1 as connected to outlet nipple 47 by a short length of hose 51, and it will be understood that a line (not shown) extends from the filter to the carburetor (not shown).

Chamber 9 is closed by a diaphragm 53 consisting of a relatively thin disk of flexible fuel-resistant material, such as a suitable synthetic rubber with a fabric insert which, in unstressed condition is flat or at least substantially flat. The diaphragm 53 is mounted on the end of rod 15 which extends out of opening 13 between a pair of circular sheet metal plates 55 and 57 backed by washers 59 and 61. Rod 15 has a reduced-diameter end portion 63 extending through central holes in the diaphragm, the plates and the washers, a fastener 65 being provided at the outer end of portion 63 holding the diaphragm, plate and washer assembly against the shoulder 67 on rod 15 at the inner end of portion 63.

The outer margin of the diaphragm 53 is clamped against the outer margin of conical flange 5 in sealing engagement with the latter by means of a cup-shaped sheet metal cap 69 having a rim 71 which is crimped on flange 5. In cap 69 is a coil compression spring 73 which reacts from the outer end of the cap against the outer diaphragm plate 55 to bias the diaphragm 53 in the direction toward partition 7 for effecting discharge strokes of the diaphragm. Cap 69 has a vent 70. Plate 55 is formed with an annular corrugation or rib 75 forming a seat for confining the inner end of the spring. Plate 55 is of larger diameter than plate 57, and the margin of plate 55 which overhangs plate 57 is flared outward in the direction toward flange 5 to provide a rim 77 on plate 55 constraining the diaphragm to have an annular free nonreversing loop 79 (see FIG. 2) convex toward partition 7. Plate 57 has a curved rim 81 engaging the loop.

Chamber 11 is closed by a diaphragm 83 consisting of a relatively thin disk of suitable flexible fuel-resistant material. As shown, diaphragm 83 is of smaller diameter than diaphragm 53. Diaphragm 83 is mounted on the other end of rod 15 from diaphragm 53 and has its margin clamped against the end of wall 3 in sealing engagement with the latter by a housing 85 constituted by a metal casting. Housing 85 has lugs for receiving screws such as are indicated at 89 in FIG. 3 for attaching it to body 1. Diaphragm 83 has a central hole receiving the rod 15, and rod 15 has an end head 91 against which the central portion of diaphragm 83 is sealingly clamped by a collar 93 pressed on the rod.

Housing 85 is recessed as indicated at 95 for accommodating diaphragm 83, and has a vent 96 for venting recess 95. Housing 85 is formed for attachment to an automotive engine part of which appears at E, having an opening 97 adapted slidably to receive a cam-operated push rod 99. The cam for operating the push rod is indicated at 101. The push rod is axially aligned with rod 15 and engageable with the end head 91 on the rod 15, but not connected to the rod 15. As shown, push rod 15 is an expansible spring-loaded rod, comprising a tube 103 and a rod 105 slidable in the tube at the end thereof toward the cam. Rod 105 has a head 107 at its outer end engageable by the cam and engageable with the end of the tube toward the cam. Rod 105 is biased outward from the sleeve in the direction toward the cam by a coil compression spring 109 in the tube reacting from a plug 111 pressed in the end of the sleeve toward the diaphragm 83. Spring 109 is weaker than spring 73. Plug 111 has a head 113 engaging the head 91 on rod 15. Movement of the rod 105 relative to the tube is limited by a pin 115 extending from the tube into a relatively wide groove 117 in the rod 105. The tube has an oil and air relief hole 119.

Operation is as follows:

With the pumping chamber 9 primed with fuel, and with fuel trapped in chamber 9, chamber 11 and the line leading to the carburetor, the diaphragms 53 and 83 are maintained in the position shown in FIG. 1 against the bias of spring 73. Rotation of cam 101 has no effect upon the diaphragms; the tube portion 103 of the expansible spring-loaded push rod 99 remains in the position shown in FIG. 1, the rod portion 105 moving in and out of the tube under the action of spring 109 and cam 101, head 107 of rod portion 105 always being spring-biased into engagement with the cam, thereby reducing noise and wear. This action may be visualized by considering cam 101 to be rotated 180° from its FIG. 1 position to bring the low point of the cam around into opposition to the head 107. As this occurs, rod portion 105 slides out of tube 103 under the bias of spring 109. Then, on another 180° rotation of the cam, rod portion 105 is pushed back in against the bias of spring 109.

Upon a demand from the carburetor for fuel, fuel is free to flow out of chamber 11 through outlet opening 45. As cam 101 rotates around from its FIG. 1 position, thereby permitting push rod 99 to slide toward the right as viewed in FIG. 1, springs 73 acts to drive the diaphragms 53 and 83 from their FIG. 1 position to their FIG. 2 position. Spring 109 is weaker than spring 73, and rod 99 remains in its contracted position under the differential bias of the two springs. Thus, diaphragm 53 is actuated through a discharge stroke with accompanying actuation of diaphragm 83 through a return stroke. Inlet check valve 19 is closed. Check valve 43 opens, and fuel is pumped from chamber 9 into chamber 11. Diaphragm 53 is larger than diaphragm 83 and the displacement of diaphragm 53 is greater than the displacement of diaphragm 83. Accordingly, the delivery of fuel from chamber 9 to chamber 11 is in excess of that required to fill chamber 11, and the excess is delivered through outlet opening 45 to the carburetor.

As the cam 101 rotates around from its FIG. 2 position, the push rod 99 is pushed back to drive the diaphragm connecting rod 15 toward the left from its FIG. 2 position, thereby actuating diaphragm 53 through a return stroke with accompanying actuation of diaphragm 83 through a discharge stroke back to the FIG. 1 position. Check valve 43 closes, and diaphragm 83 pumps fuel from chamber 11 through outlet opening 45. Inlet check valve 19 opens, and chamber 9 is primed with fuel from the fuel supply.

Thus, the pump is actuated directly from the push rod 99, with pumping both on movement of the diaphragms in one direction by the spring 73 and in the other direction by the push rod. It will be understood that the push rod need not be an expansible spring-loaded rod as shown, though this may be preferable for noise and wear reduction. It will be observed that, essentially, chamber 9 and diaphragm 53 constitute a first expansible chamber pump unit and chamber 11 and diaphragm 83 constitute a second expansible chamber pump unit, with rod 15 constituting means connecting the units for actuation of the first through a discharge stroke with accompanying actuation of the second through a return stroke, and vice versa, and with opening 41 constituting a passage from the first to the second having check valve 43 therein adapted to open on a discharge stroke of the first and to close on a discharge stroke of the second.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In a variable stroke pump for supplying fuel to a carburetor for an internal combustion engine, a housing providing first and second opposed coaxial pumping chambers, first and second coaxial diaphragms, one for each chamber, a rod connecting the diaphragms, spring means engaging said housing and biasing the diaphragms and rod in one direction for movement of the first diaphragm through a discharge stroke and accompanying movement of the second diaphragm through a return stroke, said rod being adapted to be moved in the opposite direction by the engine for movement of the first diaphragm through a suction stroke and accompanying movement of the second diaphragm through a discharge stroke, said housing having a partition provided with an inlet to the first chamber, a check valve for the inlet adapted to open on a return stroke of the first diaphragm and to close on a discharge stroke of the first diaphragm, said partition having a passage from the first chamber to the second chamber, a check valve for said passage adapted to open on a discharge stroke of the first diaphragm and to close on a return stroke of the first diaphragm, and an outlet from the second chamber adapted to supply fuel to the carburetor.

2. A pump as set forth in claim 1 wherein the displacement of the first diaphragm is greater than the displacement of the second diaphragm.

3. A pump as set forth in claim 1 having a push rod engageable with one end of the diaphragm connecting rod for moving the latter rod in said opposite direction.

4. A pump as set forth in claim 3 wherein said push rod is an expansible spring-loaded rod adapted for operation by a cam.

5. A pump comprising a body having an annular cylindrical wall, a flange at one end of said wall flaring outward away from said wall, and a partition in said body dividing the space therein into a first pumping chamber bounded by said flange and a second pumping chamber bounded by said wall, a first diaphragm at said one end of said body closing said first chamber and a second diaphragm at the other end of said body closing the second chamber, a rod extending slidably through the partition connected at one end to the first diaphragm and at its other end to the second diaphragm, a cap on said one end of the body, a spring in said cap acting against the first diaphragm to bias the first diaphragm, the rod and the second diaphragm to move in the direction toward said other end of the body, said rod being adapted to be pushed in the opposite direction for moving the diaphragms in the opposite direction by a push rod engaging said other end of said diaphragm connecting rod, said body having an inlet leading to said first chamber, a check valve in said inlet adapted to open on a return stroke of the first diaphragm in the direction away from the partition and to close on a discharge stroke of said first diaphragm in the direction toward the partition, said partition having a transfer passage leading from the first chamber to the second chamber, a check valve for said transfer passage adapted to open on a discharge stroke of the first diaphragm and to close on a return stroke of the first diaphragm, and said body having an outlet leading from the second chamber.

6. A pump as set forth in claim 5 wherein said first diaphragm is of greater diameter than the second diaphragm and effects greater displacement than the second.

7. A pump as set forth in claim 6 wherein the outer margin of the first diaphragm is clamped against the flange by the cap and wherein the diaphragm connecting rod carries means constraining the first diaphragm to have an annular free nonreversing loop convex toward the partition.

8. A pump as set forth in claim 7 wherein a housing is provided having a recess for accommodating said second diaphragm and an opening concentric with said diaphragm adapted slidably to receive a push rod and wherein the second diaphragm is clamped against the other end of the body by said housing.

9. A pump as set forth in claim 8 comprising an expansible spring-loaded push rod slidable in said opening and engageable with said other end of said diaphragm connecting rod.

10. In a variable stroke pump for supplying fuel to a carburetor for an internal combustion engine, a pump body having a pumping chamber and an outlet chamber, flexible diaphragms forming one wall of their respective chambers, a rod slidably mounted for reciprocative movement in said body, and secured to said diaphragms, means including an inlet check valve to supply fuel to said pumping chamber during a suction stroke of the pumping chamber diaphragm, means including an outlet check valve for the flow of fuel from the pumping chamber to the outlet chamber during a discharge stroke of the pumping chamber diaphragm, resilient means provided on said body biasing said rod in one direction to discharge fuel from said pumping chamber into said outlet chamber, said rod being movable in the other direction by the engine to draw fuel into the pumping chamber.

11. In a variable stroke pump for supplying fuel to a carburetor for an internal combustion engine, a pump body having a pumping chamber and an outlet chamber, flexible diaphragms forming one wall of their respective chambers, a rod slidably mounted for reciprocative movement in said body, and secured to said diaphragms, means including an inlet check valve to supply fuel to said pumping chamber during a suction stroke of the pumping chamber diaphragm, means including an outlet check valve for the flow of fuel from the pumping chamber to the outlet chamber during a discharge stroke of the pumping chamber diaphragm, resilient means provided on said body biasing said rod in one direction to discharge fuel from said pumping chamber into said outlet chamber, said rod being movable in the other direction by the engine to draw fuel into the pumping chamber, a cap securing the periphery of said pumping chamber diaphragm to said body, said resilient means comprising a helical compression spring seated on said cap.

12. In a variable stroke pump for supplying fuel to a carburetor for an internal combustion engine, a pump body having a pumping chamber and an outlet chamber, flexible diaphragms forming one wall of their respective chambers, a rod slidably mounted for reciprocative movement in said body, means securing said rod to said diaphragms, means including an inlet check valve to supply fuel to said pumping chamber during a suction stroke of the pumping chamber diaphragm, means including an outlet check valve for the flow of fuel from the pumping chamber to the outlet chamber during a discharge stroke of the pumping chamber diaphragm, resilient means provided on said body biasing said rod in one direction to discharge fuel from said pumping chamber into said outlet chamber, said rod being movable in the other direction by the engine to draw fuel into the pumping chamber, a cap securing the periphery of said pumping chamber diaphragm to said body, said resilient means comprising a helical compression spring seated on said cap.

13. In a variable stroke pump for supplying fuel to a carburetor for an internal combustion engine, two expansible chamber pump units and having an inlet to one unit and an outlet from the other, means connecting the units for actuation of one unit through a discharge stroke and accompanying actuation of the other through a return stroke and vice versa, said pump units having a passage from a first of the units to the second unit with a check valve therein adapted to open on a discharge stroke of the first unit and to close on a return stroke of the first unit, said first unit acting on a discharge stroke thereof to pump fluid to the second unit, said first unit having an inlet check valve to open on a return stroke of the first unit, and the second unit acting on a discharge stroke thereof to pump fluid through the outlet, each pump unit being a diaphragm pump, the two diaphragm pump units being coaxial, and the means connecting the units comprising a rod connecting their diaphragms, the displacement of the diaphragm of the first unit being greater than the displacement of the diaphragm of the second unit, a cover provided on said second pump unit, a compression spring seated on said cover and acting to bias the diaphragms for actuation of one diaphragm through a discharge stroke and accompanying actuation of the other diaphragm through a return stroke, and a push rod engageable with the diaphragm connecting rod for actuation of the one diaphragm through a return stroke and accompanying actuation of the other through a discharge stroke.

14. A pump as set forth in claim 13 wherein said push rod is an expansible spring-loaded push rod adapted for operation by a cam.

15. In a variable stroke pump for supplying fuel to a carburetor of an internal combustion engine, a housing having first and second coaxial pumping chambers, first and second diaphragms providing movable walls for said first and second chambers, respectively, a rod interconnecting said diaphragms, a compression spring engaging said housing and biasing said diaphragms and rod in one direction, said diaphragms and rod being adapted to be moved in the opposite direction by the engine, and means including inlet and outlet check valves controlling the flow of fuel through said chambers in series to supply a carburetor responsive to reciprocable movement of said diaphragms and rod.

16. In a variable stroke pump for supplying fuel to a carburetor of an internal combustion engine, a body having an annular cylindrical wall, a flange at one end of said wall flaring outward away from said wall, and a partition in said body dividing the space therein into a first pumping chamber bounded by said flange and a second pumping chamber bounded by said wall, a first diaphragm at said one end of said body closing said first chamber and a second diaphragm at the other end of said body closing the second chamber, a rod extending slidably through the partition connected at one end to the first diaphragm and at its other end to the second diaphragm, a cap on said one end of the body, a spring in said cap acting against the first diaphragm to bias the first diaphragm, the rod and the second diaphragm to move in the direction toward said other end of the body, said rod being adapted to be pushed in the opposite direction by the engine, and means including inlet and outlet check valves controlling the flow of fuel through said chambers in series to supply a carburetor responsive to reciprocable movement of said diaphragms and rod.

*17. A fuel pump having a casing and a pumping diaphragm cooperating with and joined to said casing to define a pumping chamber for handling a liquid fuel, an inlet and an outlet to said chamber, pressure-actuated valves controlling said inlet and outlet, a cup at one side of said diaphragm cooperating with the latter in defining a vented spring chamber, spring means in said spring chamber and urging said diaphragm in one direction automatically to regulate the discharge pressure in said outlet, and a reciprocable stem operable from the exterior of said casing at the other side of said diaphragm for actuating the latter in the opposite direction as a suction stroke.*

*18. A single acting fuel pump having a casing and a pumping diaphragm, the latter and said casing defining a pumping chamber on one side of said diaphragm for handling liquid fuel, an inlet and an outlet to said pumping chamber, pressure actuated one-way valves controlling said inlet and outlet, open supporting means located at the other side of said pumping diaphragm, a spring compressed between said supporting means and said pumping diaphragm and cooperating with atmospheric pressure in biasing said pumping diaphragm toward said one side, a reciprocable stem fixed to said pumping diaphragm and slidably mounted in said casing on said one side of said diaphragm, and means forming a seal between said stem and casing to constrain fuel flow between said valves to said pumping chamber.*

References Cited by the Examiner

The following references, cited by the Examiner, are of record in the patented file of this patent or the original patent.

UNITED STATES PATENTS

| | | | |
|---|---|---|---|
| 220,350 | 10/79 | Cushier | 103—168 |
| 862,867 | 8/07 | Eggleston | 230—170 X |
| 1,893,215 | 1/33 | Babitch | 103—150 X |

DONLEY J. STOCKING, *Primary Examiner.*

JOSEPH H. BRANSON, JR., LAURENCE V. EFNER, *Examiners.*